United States Patent
Kleinschroth et al.

Patent Number: 5,928,508
Date of Patent: Jul. 27, 1999

[54] METHOD AND APPARATUS FOR SEPARATING A MEDIUM INTO A SOLIDS-CONTAINING COMPONENT AND A LIQUID COMPONENT

[75] Inventors: Karl-Heinz Kleinschroth, Frankfurt; Johann Lisson, Darmstadt; Klaus Blinn, Roedermark; Josef Sowka, Hanover, all of Germany

[73] Assignee: Siemens Aktiengesellschaft, Munich, Germany

[21] Appl. No.: 08/976,731

[22] Filed: Nov. 24, 1997

Related U.S. Application Data

[63] Continuation of application No. PCT/DE96/00803, May 9, 1996.

[30] Foreign Application Priority Data

May 22, 1995 [DE] Germany .................. 195 18 701

[51] Int. Cl.⁶ .................. B01D 33/073; B01D 33/48; B01D 33/66; G21F 9/06
[52] U.S. Cl. .................. 210/184; 210/186; 210/297; 210/319; 210/398; 210/402; 210/393; 210/411
[58] Field of Search .................. 210/184, 186, 210/393, 391, 398, 402, 411, 297, 319, 774, 784, 798, 806, 28

[56] References Cited

U.S. PATENT DOCUMENTS

| | | |
|---|---|---|
| 2,596,384 | 5/1952 | Dunmire . |
| 2,925,913 | 2/1960 | Wheeler . |
| 3,272,481 | 9/1966 | Nauta . |
| 3,311,235 | 3/1967 | Ahlfors . |
| 3,333,700 | 8/1967 | Coleman . |
| 3,460,681 | 8/1969 | List et al. . |
| 3,784,017 | 1/1974 | Arnold . |
| 4,115,265 | 9/1978 | Otte . |
| 4,123,356 | 10/1978 | Sugimoto . |
| 4,498,446 | 2/1985 | Judson . |
| 4,773,997 | 9/1988 | Butte . |
| 4,956,102 | 9/1990 | Allsing . |
| 5,114,081 | 5/1992 | Takenaka . |
| 5,387,339 | 2/1995 | Lee . |
| 5,565,095 | 10/1996 | Snowball . |

FOREIGN PATENT DOCUMENTS

| | | |
|---|---|---|
| 2618232 | 11/1977 | Germany . |
| 3138674 | 6/1982 | Germany . |
| 3819137A1 | 12/1989 | Germany . |
| 4137496A1 | 5/1993 | Germany . |
| 541499 | 11/1941 | United Kingdom . |
| 1038501 | 8/1966 | United Kingdom . |

OTHER PUBLICATIONS

Derwent Publication of Japanese Patent Abstract No. 95–133883, Mar. 3, 1995.
Derwent Publication of Japanese Patent Abstract No. 86–052986, dated May 29, 1986.

*Primary Examiner*—Thomas M. Lithgow
*Attorney, Agent, or Firm*—Herbert L. Lerner; Laurence A. Greenberg

[57] ABSTRACT

A medium is separated into a solids-containing component and a liquid component. The latter flows through a filter. Clogging of the filter is avoided in that the latter is moved relative to the medium perpendicularly to the flow direction of the liquid through the filter element. At the same time, the medium is agitated.

7 Claims, 1 Drawing Sheet

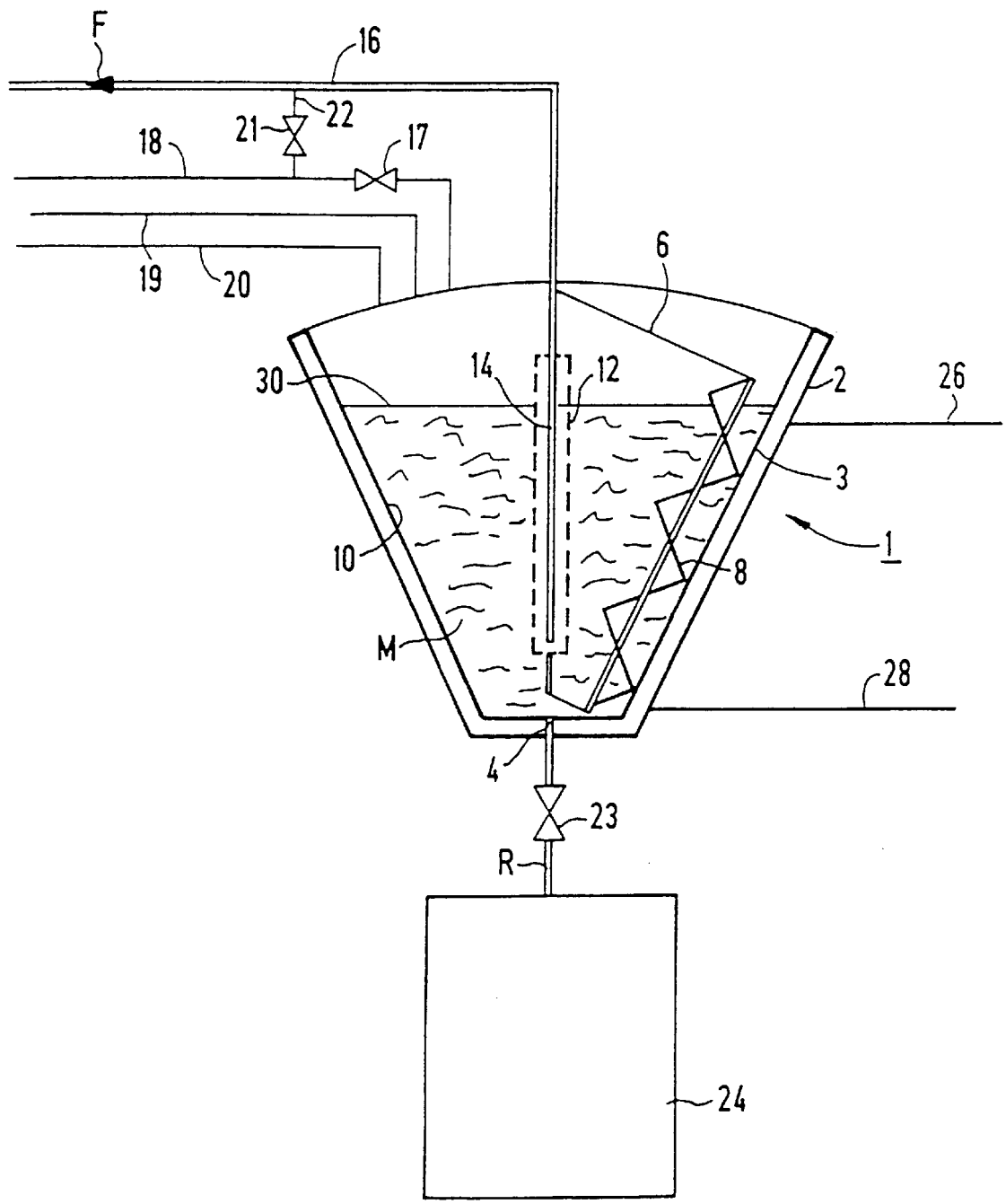

METHOD AND APPARATUS FOR SEPARATING A MEDIUM INTO A SOLIDS-CONTAINING COMPONENT AND A LIQUID COMPONENT

CROSS-REFERENCE TO RELATED APPLICATION

This application is a continuation of international application Ser. No. PCT/DE96/00803, filed May 9, 1996.

BACKGROUND OF THE INVENTION

FIELD OF THE INVENTION

The invention relates to a method for separating a medium into a solids-containing component and a liquid component, particularly for the dewatering and drying of waste sludge from nuclear plants, in which the liquid component flows through a filter. The invention relates, furthermore, to an apparatus for carrying out the method.

Various types of solids-containing radioactive waste sludge are produced in nuclear power plants, such as, for example, spheroidal or pulverulent resin sludge or lapping agent suspensions. In order to ensure appropriate intermediate or final storage, waste sludge of this type must first be dewatered and dried before further treatment, for example, before being bound in bitumen or pressed under high pressure. As a result of the dewatering which precedes drying and in which capillary and/or gusset water is separated off and fed to a waste water system, a high material throughput with low energy consumption and therefore effective treatment of the waste can be achieved.

Suction filters are normally used in the dewatering operations of this type. The medium to be dewatered is thereby subjected to excess pressure in a vessel, in the bottom region of which a filter element is arranged. The liquid component of the medium, for example the gusset water, is thereby forced through the filter element. The solids-containing component of the medium is retained by the filter element. The solids-containing filter residue is then normally supplied to a drying stage.

However, the filter elements of such suction filters become clogged rather quickly and they require cleaning or exchange after only short operating periods.

SUMMARY OF THE INVENTION

It is accordingly an object of the invention to provide a method and device for separating a medium into a solids-containing component and a liquid component, which overcomes the above-mentioned disadvantages of the heretofore-known devices and methods of this general type and which prevents clogging of the filter even at a low outlay in terms of cleaning or maintenance.

With the foregoing and other objects in view there is provided, in accordance with the invention, a method of separating a medium into a solids-containing component and a liquid component. The method comprises the following steps:

agitating a medium containing solids and liquid;
conducting the liquid through a filter in a given throughflow direction; and
simultaneously moving the filter relative to the medium substantially perpendicularly to the given throughflow direction for stripping off filter residue.

In accordance with an added feature of the invention, the agitating step comprises agitating waste sludge of a nuclear power plant and the filter residue is further dewatered and dried.

In other words, the objects of the invention are satisfied in that the filter, for the purpose of stripping off filter residue, is moved relative to the medium in a direction substantially perpendicular to the throughflow direction, and in that the medium is stirred or agitated.

The invention is based on the premise that, when a filter becomes clogged, first some solid particles contained in the medium adhere to the filter. These then lump together with further solid particles in their vicinity. This may continue until the filter is clogged completely. Clogging of the filter may therefore be avoided or impeded by suppressing the adhesion of solid particles to the filter. In order to suppress the adhesion of solid particles to the filter, a relative movement between the filter and the medium to be separated which takes place approximately perpendicularly to the throughflow direction has proved particularly effective.

In order further to assist the separation of liquid and solids-containing components of the medium, the latter is additionally agitated. Moreover, this is conducive to the transport of heat within the medium, so that the medium is heated more easily and the dewatering is assisted or the drying operation is accelerated.

In order to make it easier to treat a radioactive medium in a particular way, after a first dewatering or drying step the medium may be scavenged by supplying non-radioactive water before it undergoes a second dewatering or drying step.

With the above and other objects in view, there is further provided, in accordance with the invention, an apparatus for separating a medium into a solids-containing component and a liquid component, comprising:

a vessel for receiving a medium containing solids and liquid, the vessel having a wall with an inner wall surface;
a cylindrical filter element rotatably mounted in the vessel;
an intermixing member and a rotatable pivoting arm carrying the intermixing member disposed within the vessel such that the intermixing member is guided along the inner wall surface when the pivoting arm rotates.

In other words the objects set for the apparatus are satisfied with a cylindrical filter element that rotates in the vessel, and in that there is arranged on a rotatable pivoting arm provided within the vessel an intermixing member which can be guided along the inner surface of the vessel when the pivoting arm rotates.

During a dewatering and drying operation, the filter element rotates about its cylinder axis, so that a movement of the filter element relative to the medium in a direction approximately perpendicular to the throughflow direction is achieved. The adhesion of solid particles contained in the medium to the filter element is thereby suppressed, so that clogging of the filter element is virtually ruled out.

Circulation and therefore intermixing of the medium is possible by means of the intermixing member, so that the separation of the medium into a solids-containing and a liquid component and also the transport of heat within the medium are assisted. Moreover, by guiding the intermixing member along the inner surface of the vessel, the adhesion of solid particles contained in the medium to the vessel wall is avoided. Such adhesion, particularly in the case of a radioactive medium, could lead to additional contamination of the vessel.

In order to make it possible to heat the medium located in the vessel, the vessel advantageously has a double-walled design, a hot steam feed conduit being connected to the vessel double wall. Furthermore, a feed conduit and/or a discharge conduit for compressed air may be arranged on the vessel.

In a further advantageous design, the filter element has a metal screen. Metal screen filters of this type have proved particularly effective for the dewatering of radioactive waste sludge.

In order to ensure that the separated liquid component of the medium is discharged even when the vessel has small filling quantities, a filtrate outflow pipe reaches virtually to the bottom of the filter element. The pipe thereby is disposed within the filter element. Moreover, any infiltrations of air into the filtrate discharge conduit when the vessel is subjected to excess pressure are avoided by means of the filtrate outflow pipe.

The advantages achieved by means of the invention are, in particular, that clogging of the filter is avoided, even at a low outlay in terms of cleaning or maintenance, by means of a movement of the filter relative to the medium perpendicularly to the throughflow direction during the separation of a medium into the solids-containing component and the liquid component. This is particularly advantageous during the dewatering and drying of waste sludge from nuclear plants during which the liquid component flows through a filter.

Other features which are considered as characteristic for the invention are set forth in the appended claims.

Although the invention is illustrated and described herein as embodied in a method and apparatus for separating a medium into a solids-containing component and a liquid component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing figures.

BRIEF DESCRIPTION OF THE DRAWING

The sole FIGURE is a diagrammatic view of a system according to the invention.

DESCRIPTION OF THE PREFERRED EMBODIMENTS

Referring now to the sole FIGURE of the drawing in detail, there is shown an apparatus 1 for separating a medium into a solids-containing component and a liquid component. The separating apparatus 1 comprises a vessel 2 which is conical in a region 3 and which has a double-walled structure. The conicity of the vessel 2 renders it conducive to complete emptying of the vessel 2 through a narrowed drainage orifice 4. The drain 4 can be closed by means of a cover or a valve. A pivoting arm 6 is disposed within the vessel 2 which is rotatable about a center axis of the cone and at the end of which there is disposed an agitator 8. The agitator 8, which is itself rotatable, is an intermixing member. The agitator 8 is disposed such that it brushes along the conical inner surface 10 of the vessel 2 when the pivoting arm 6 rotates.

A cylindrical filter element 12 is arranged within the vessel 2 coaxially with the cone axis so as to be rotatable about its cylinder axis. In the preferred embodiment, the filter element 12 is formed from a metal screen. A filtrate outflow pipe 14 is arranged in the cylinder axis of the filter element 12. The pipe 14 is connected to a filtrate discharge conduit 16 outside the vessel 2. The filtrate outflow pipe 14 reaches virtually as far as the bottom of the filter element 12.

A compressed air feed conduit 18, which can be shut off by means of a valve, a water feed conduit 19, and a material feed conduit 20 communicate with the vessel 2. In order to make it possible to scavenge and/or blow out the filter element 12, the compressed air conduit 18 is connected to the filtrate discharge conduit 16 via a conduit 22. A valve 21 is provided for selectively shutting off the connection between the pipe 16 and the air conduit 18.

A stationary or movable vessel 24 is provided underneath the drainage orifice 4 of the vessel 2. The drainage can be closed with a valve 23. In order to assist a filtering operation, both the valve 23 and the lower part of the conical region 3 may be designed as filters. A hot steam feed conduit 26 and a discharge conduit 28 are connected to the double-walled conical region 3 of the vessel 2.

In operation, the vessel 2 is filled to a level 30 with a medium M, for example waste sludge from a nuclear plant. The waste sludge is fed in through the feed conduit 20 and is to be separated into a liquid component and a solids-containing component. To separate the liquid component from the solid component of the medium M, the vessel 2 is subjected to excess pressure by means of the compressed air feed conduit 18. The liquid component of the medium M is thereby forced through the filter 12 and it reaches the interior of the filter element 12 in the form of a filtrate F. Due to the pressure ratios, the filtrate F exits via the filtrate outflow pipe 14 to the filtrate discharge conduit 16 and via the latter to a non-illustrated separating vessel. The solids-containing component of the medium M is thus enriched in the vessel 2, so that the medium M is dewatered. For this purpose, the filtrate outflow pipe 14 reaches virtually as far as the bottom of the filter element 12, so that the infiltration of air from the vessel 2 subjected to excess pressure into the filtrate discharge conduit is avoided even in the case of a low level 30. In order to avoid clogging the filter element 12 with solid particles contained in the medium M, the filter element 12 rotates about its cylinder axis. In other words: the filter element 12 is thus moved relative to the medium M perpendicularly to the throughflow direction.

Hot steam is fed to the double-walled conical region of the vessel 2 via the hot steam feed conduit 26. As a result, the medium M is heated. Heating the medium M in this way assists in the separation of the liquid component from the medium M and therefore the dewatering and also drying of the solids-containing component of the medium M. The pivoting arm 6 rotates jointly with the filter element 12. The similarly rotating agitator 8 is disposed on the pivoting arm. The continuous intermixing of the medium M in the vessel 2 which is thus achieved is conducive to separating the medium M into a solids-containing component and a liquid component. Moreover, the transport of heat within the medium M is thereby assisted, so that it becomes easier to heat the medium M. Furthermore, the agitator 8 guided along the inner wall 10 of the vessel 2 prevents the adhesion of solid particles of the medium M to the vessel inner wall 10 and therefore contamination of the vessel 2 in the case of the treatment of radioactive materials.

After the solids-containing component of the medium M has been dewatered and dried, the remaining residue R is fed to the vessel 24 by opening the drainage valve 22. The interior of the filter element 12 may additionally be put under excess pressure by means of the compressed air feed conduit connected to the filter discharge conduit 16, so that it becomes possible for the filter element 12 to be blown out in reverse.

In the case of the treatment of a radioactive medium M, after a first dewatering step the latter may initially be scavenged by feeding water W through the water feed conduit 19. This results in a diluting effect.

The separating apparatus 1 affords the additional advantage of a compact construction and makes it possible to carry out the various treatment processes, such as dewatering, scavenging or drying, within a single vessel 2. This is advantageous particularly in the case of the treatment of radioactive waste sludge. The rotation of the filter element 12 and of the agitator 8 on the rotating pivoting arm 6 ensures an effective separating operation, while the clogging of the filter element 12 is avoided, even at a low outlay in terms of cleaning or maintenance.

We claim:

1. An apparatus for separating a medium into a solids-containing component and a liquid component, comprising:

a vessel for receiving a medium containing solids and liquid, said vessel having a wall with an inner wall surface;

a cylindrical filter element rotatably mounted in said vessel and having a bottom;

an intermixing member and a rotatable pivoting arm carrying said intermixing member disposed within said vessel such that said intermixing member is guided along said inner wall surface when said pivoting arm rotates; and a filtrate outflow pipe disposed within said filter element and extending substantially to said bottom.

2. The apparatus according to claim 1, wherein said wall of said vessel is a double-wall.

3. The apparatus according to claim 1, wherein said filter element has a metal screen.

4. The apparatus according to claim 1, which further comprises a compressed air feed conduit.

5. The apparatus according to claim 4, which further comprises a compressed air discharge conduit communicating with said vessel.

6. The apparatus according to claim 1, which further comprises a compressed air discharge conduit communicating with said vessel.

7. The apparatus according to claim 1, which further comprises a hot steam feed conduit disposed at said vessel.

* * * * *

UNITED STATES PATENT AND TRADEMARK OFFICE
CERTIFICATE OF CORRECTION

PATENT NO. : 5,928,508
DATED : July 27, 1999
INVENTOR(S) : Karl-Heinz Kleinschroth et al.

It is certified that error appears in the above-identified patent and that said Letters Patent is hereby corrected as shown below:

On the title page,

Item [75] should read as follows:

Inventors:

Karl-Heinz Kleinschroth, Frankfurt; Johann Lisson, Darmstadt; Klaus Blinn, Roedermark; Josef Sowka, Hannover, all of Germany Signed and Sealed this First Day of February, 2000

Attest:

Q. TODD DICKINSON

*Attesting Officer*       *Acting Commissioner of Patents and Trademarks*